United States Patent Office 3,223,140
Patented Dec. 14, 1965

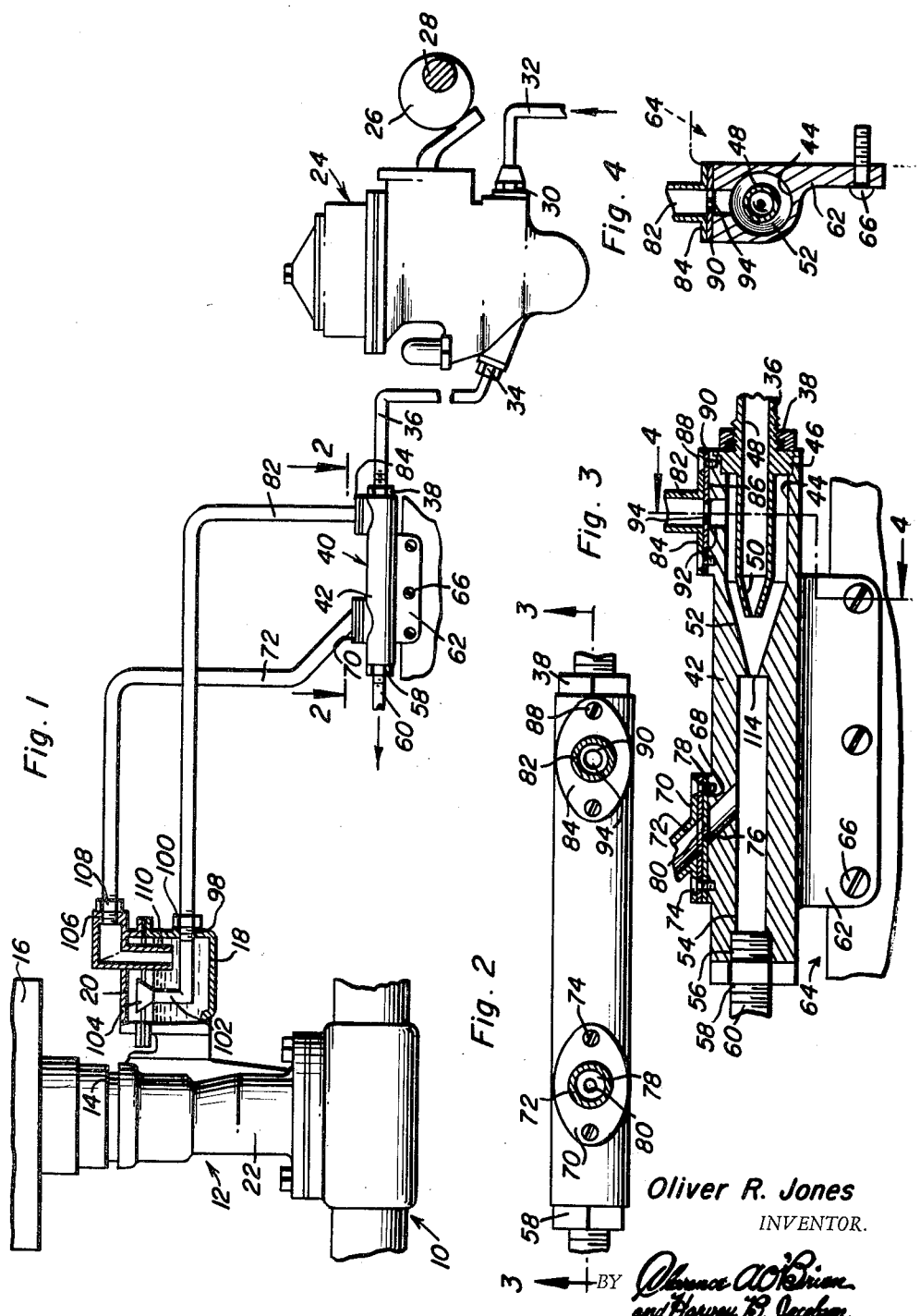

3,223,140
SELF-CONTROLLED FUEL SYSTEM
Oliver R. Jones, 903 Donald Drive, Longview, Tex.
Filed Jan. 16, 1964, Ser. No. 338,200
11 Claims. (Cl. 158—36.4)

This invention relates to a novel and useful self controlled fuel system and more specifically to a fuel system designed primarily for supplying a constant supply of fuel to a carburetor reservoir and for maintaining a constant level of liquid fuel in the reservoir.

The self controlled fuel system of the instant invention, other than the actual pumping mechanism needed to supply fuel under pressure, does not include any moving parts such as floats, float valves, and check valves and is therefore highly dependable in operation.

Although the self controlled fuel supply system of the instant invention is specifically illustrated and described herein as being utilized to maintain the proper fuel level in the carburetor fuel reservoir, it is to be noted that the instant invention may be readily utilized in any liquid delivery system for maintaining a proper level of liquid within a reservoir from which the supplied liquid is to be drawn.

Most conventional types of internal combustion engine carburetors are provided with a float chamber to which fuel is supplied under pressure and which includes a float controlled inlet valve for closing the fuel inlet of the chamber in response to a given fuel level in the reservoir being reached. While this type of fuel supply system for the fuel reservoir of a conventional internal combustion engine carburetor operates satisfactorily under most conditions, it would be more advantageous to provide a means by which the fuel level in an internal combustion engine carburetor reservoir could be maintained adjacent a predetermined level without ever exceeding that predetermined level.

As float actuated inlet valves for carburetor float chambers are sometimes prevented from being fully closed by foreign matter disposed between the valve element and its seat and the expansion of the liquid fuel in the float chamber due to an increase of heat of the liquid fuel can cause the fuel level in the float chamber to rise above the predetermined maximum, it is the main object of this invention to provide a self controlled fuel supply system for the reservoir of a carburetor constructed in a manner whereby a more precise fuel level may be maintained in the reservoir with means being provided whereby a predetermined maximum fuel level can never be exceeded.

Still another object of this invention, in accordance with the immediately preceding object, is to provide a self controlled fuel supply system constructed in a manner whereby the fuel system, other than the conventional fuel pump, utilizes no moving parts.

Yet another object of this invention is to provide a self controlled fuel supply system which will be capable of supplying fuel to the reservoir of a carburetor from a fuel supply tank at a predetermined rate corresponding to the speed of operation of the internal combustion engine and which will be capable of returning all excess fuel supplied to the carburetor to the fuel tank of the internal combustion engine.

Still another object of this invention is to provide a self controlled fuel supply system for the carburetor of an internal combustion engine constructed in a manner whereby it may be readily installed in an existing fuel supply system with only minor structural modifications being required of the existing portions of the original fuel supply system.

A final object of this invention to be specifically enumerated herein is to provide a self controlled fuel system in accordance with the preceding objects which will conform to conventional forms of manufacture, be of simple construction and automatic in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary partial diagrammatical view of a fuel supply system constructed in accordance with the present invention, portions of the initial supply and the associated internal combustion engine being removed;

FIGURE 2 is an enlarged fragmentary horizontal sectional view taken substantially upon the plane indicated by the section line 2—2 of FIGURE 1;

FIGURE 3 is a fragmentary longitudinal vertical sectional view taken substantially upon a plane indicated by the section line 3—3 of FIGURE 2; and FIGURE 4 is a fragmentary transverse vertical sectional view taken substantially upon the plane indicated by the section line 4—4 of FIGURE 3.

Referring now more specifically to the drawings the numeral 10 generally designates a portion of the conventional form of internal combustion engine which comprises the intake manifold of the engine. The intake manifold 10 has a substantially conventional down draft carburetor 12 mounted thereon including an air inlet horn 14 to which an air cleaner 16 is secured. The carburetor 12 further includes a fuel reservoir 18 including a removable cover 20 and it is to be understood that the carburetor 12 is provided with various mechanisms for drawing fuel from the reservoir 18 and metering it into the air and fuel passages (not shown) extending through the carburetor base 22.

The carburetor 12 is included in the fuel system of the instant invention although it is to be noted that the reservoir 18 could be formed as a portion of any type of liquid dispenser.

The fuel system of the invention further includes the conventional form of fuel pump generally referred to by the reference numeral 24 which is actuated by a cam lobe 26 formed on a shaft 28 driven by the internal combustion engine 10. The fuel pump 24 includes an inlet 30 to which one section 32 of a supply line extends from the outlet of any suitable liquid fuel tank (not shown). In addition, the fuel pump includes an outlet 34 and a second section 36 of the fuel supply line extends from the fuel pump outlet 34 to the inlet 38 of an eductor generally referred to by the reference numeral 40. The eductor 40 includes an elongated body 42 having a bore 44 formed in one end thereof and which includes a counterbore 46. The inlet 38 comprises an inlet nozzle 48 to which the outlet end of the section 36 is secured and it may be seen that the bore 44 defines a chamber within the body 42 within which the nozzle 48 is loosely received, the nozzle 48 including a tapered discharge end 50 disposed in a conical inner end portion 52 of the bore 44. The other end of the body 42 has a second bore 54 formed therein which is axially aligned with the bore 44 and which includes a threaded counterbore 56. The bore 54 comprises an outlet for the body 42 and an outlet fitting 58 of one end of a by-pass line 60 is threadedly engaged in the threaded counterbore 56, the remote end of the by-pass line 60 opening into the fuel tank (not shown).

The inner ends of the bores 44 and 54 are communicated and it may be seen that the body 42 includes a mounting bracket 62 for securement to any portion of the associated motor vehicle generally referred to by the reference numeral 64 by means of fasteners 66.

The body 42 is provided with a machined face 68 to which the flanged end 70 of a delivery line 72 is secured in any convenient manner by means of fasteners 74. A transverse bore 76 is communicated with the bore 54 at its inner end and opens through the machined face 68 at its outer end and is communicated with the adjacent end of the delivery line 72. In addition, an apertured metering plate 78 may be interposed between the flanged end 70 and the machined face 68 and held in position by means of the fastener 74 so that its centrally located metering aperture 80 communicates the delivery line 72 with the transverse bore 76.

In addition, one end of a return line 82 is flanged as at 84 and secured to a second machined face 86 of the body 42 by means of fasteners 88 with a centrally apertured gasket 90 being disposed between the flanged end 84 of the return line 82 and the machined face 86. In addition, a transverse bore 92 is formed in the body 42 and is communicated with the chamber 44 upstream from the conical portion 52 at its inner end and with the outlet end of the return line 82 at its outer end by means of the centrally located aperture 94 formed in the gasket 90.

The end of the return line 82 remote from the body 42 is secured through an outlet opening 98 formed in the reservoir 18 by means of a fitting 100 and includes a standpipe 102 disposed within the reservoir 18 whose upper end is flared as at 104. The open flared end of the standpipe 102 defines the maximum fuel level within the reservoir 18 and the removable cover 20 includes a fuel inlet 106 to which the end of the delivery line 72 remote from the body 42 is secured by means of a fitting 108. The inlet 106 includes a depending discharge neck 110 which projects below the upper end of the standpipe 102 and thus below the maximum fuel level within the fuel reservoir 18.

In operation, as the fuel pump 24 is actuated by means of the cam lobe 26, fuel is pumped from the tank (not shown) through the section 36 of the fuel supply line and into the inlet nozzle 48 whereupon the pumped fuel is discharged outwardly through the reduced outlet end 50 of the nozzle 48 and directed through the window or port 114 communicating the conical end portion 50 with the bore 54. The passage of fuel through the port or window 114 creates a partial vacuum in the chamber defined by the bore 44 and in this manner any overflow of liquid fuel entering the upper end of the standpipe 102 is drawn into the chamber defined by the bore 44 and subsequently forced through the port or window 114. As the pumped fuel and fuel returned to the body 42 is pumped through the port or window 114 it passes into the bore 54 and through the by-pass line 60 back into the tank (not shown). However, the by-pass line 60 offers some resistance to the flow of liquid therethrough and therefore the static pressure of the fuel within the bore 54 is sufficient to cause fuel to be pumped upwardly through the metering plate 68, into the delivery line 72 and thereafter into the reservoir 18. Whatever excess amount of fuel is pumped into the reservoir 18 passes downwardly through the standpipe 102 to again be returned to the vacuum chamber defined by the bore 44 and thereafter drawn through the port or window 114 with the fuel being discharged from the nozzle 48. Accordingly, it may be seen that the eductor utilized in the manner hereinbefore set forth provides a means whereby a constant supply of fuel within the reservoir 18 may be maintained at the proper fuel level and without any possibility of a buildup of pressure within the reservoir 18.

The metering plate 78 is provided in order to accurately control the amount of fuel which is pumped into the reservoir 18 through the delivery line 72. The size of the apertures 94 and 80 may be changed as desired merely by removing the metering plate 78 and substituting therefor a similar plate having a different size aperture formed therethrough.

It is further contemplated that a constant flow fuel pump may be utilized in lieu of the more or less conventional fuel pump 24 which has a pulse-type discharge and it is further contemplated that the metering plate 78 could be replaced by variable metering means that could be adjusted so as to vary the liquid flow during operation of the fuel supply system. Finally, it is additionally contemplated that an accumulator could be interposed in the section 36 of the fuel supply line extending from the conventional fuel pump 34 to the inlet nozzle 48, which accumulator could then provide a more or less constant flow of fuel to the nozzle 48 even though a fuel pump such as a fuel pump 24 is utilized.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self controlled fuel system for supplying fuel to a carburetor reservoir and for maintaining a constant level of liquid fuel in said reservoir, said fuel system comprising a carburetor of an internal combustion engine including a reservoir having an inlet and an outlet, a fuel supply line having a fuel pump disposed therein and including an inlet end adapted to be connected to a fuel tank outlet and an outlet end, an eductor defining a vacuum chamber, a nozzle type inlet opening into said chamber, said supply line outlet end being in communication with said nozzle-type inlet, an outlet in alignment with the discharge of said inlet, and a vacuum inlet opening into said chamber, a return line communicating said reservoir outlet with said vacuum inlet, by-pass line means, said eductor outlet defining the inlet end of said by-pass line means, said by-pass line means being adapted to have its outlet end communicated with said tank, delivery line means including an inlet end communicated with said by-pass line means adjacent but downstream of said eductor outlet, and an outlet end communicated with said reservoir inlet, said reservoir outlet opening inwardly of said reservoir at a level therein defining a preferred fuel supply level.

2. The combination of claim 1 wherein said reservoir outlet includes an inlet end defining a standpipe in said reservoir whose open upper end is disposed at said fuel supply level.

3. The combination of claim 2 wherein said open upper end is flared and occupies an appreciable portion of the plan area of said reservoir at said fuel level so as to reduce sloshing of fuel in said reservoir.

4. A self controlled liquid supply system for supplying liquid to a reservoir from which liquid may be drawn and for maintaining a constant level of liquid in said reservoir, said liquid supply system comprising a liquid dispensing member including a reservoir having an inlet and an outlet, a liquid supply line having a liquid pump disposed therein and including an inlet end adapted to be connected to a liquid supply tank outlet and an outlet end, an eductor defining a vacuum chamber, a nozzle type inlet opening into said chamber, said supply line outlet end being in communication with said nozzle type inlet, an outlet in alignment with the discharge of said inlet, and a vacuum inlet opening into said chamber, a return line communicating said reservoir outlet with said vacuum inlet, by-pass line means, said eductor outlet defining the inlet end of said by-pass line means, said by-pass line means being adapted to have its outlet end communicated with said tank, delivery line means including an inlet end communicated with said by-pass line means adjacent but downstream of said eductor outlet, and an outlet end communicated with said reservoir inlet, said reservoir outlet opening inwardly of said reservoir at a level therein defining a preferred liquid supply level.

5. The combination of claim 1 wherein the outlet of said reservoir is disposed at an elevation higher than said vacuum chamber and any portion of said return line.

6. The combination of claim 1 wherein said reservoir inlet includes a depending outlet neck portion extending from a point above said supply level to and opening at a point below said supply level.

7. The combination of claim 1 wherein said vacuum inlet includes liquid flow metering means.

8. The combination of claim 1 wherein said delivery line includes liquid flow metering means.

9. The combination of claim 1 wherein said eductor comprises a body having a blind bore formed therein defining said chamber, the inner end portion of said bore being conical and tapering inwardly, said nozzle-type inlet comprising an inlet nozzle received in the outer end of said bore and including a tapered inner end portion projecting into said conical end portion, said body having a second blind bore formed therein axially aligned with the first mentioned blind bore, opening inwardly at its inner end into the minor diameter end of said conical end portion, and defining the upstream end of said by-pass line means.

10. The combination of claim 9 wherein said return line opens inwardly of said chamber downstream of said conical end portion.

11. The combination of claim 10 wherein said delivery line inlet opens inwardly of said body into the second blind bore.

References Cited by the Examiner
UNITED STATES PATENTS 1,857,004   5/1932   Rebillet _____ 158—36.4 X FREDERICK L. MATTESON, Jr., *Primary Examiner.*

FREDERICK KETTERER, *Examiner.*